Patented Apr. 16, 1940

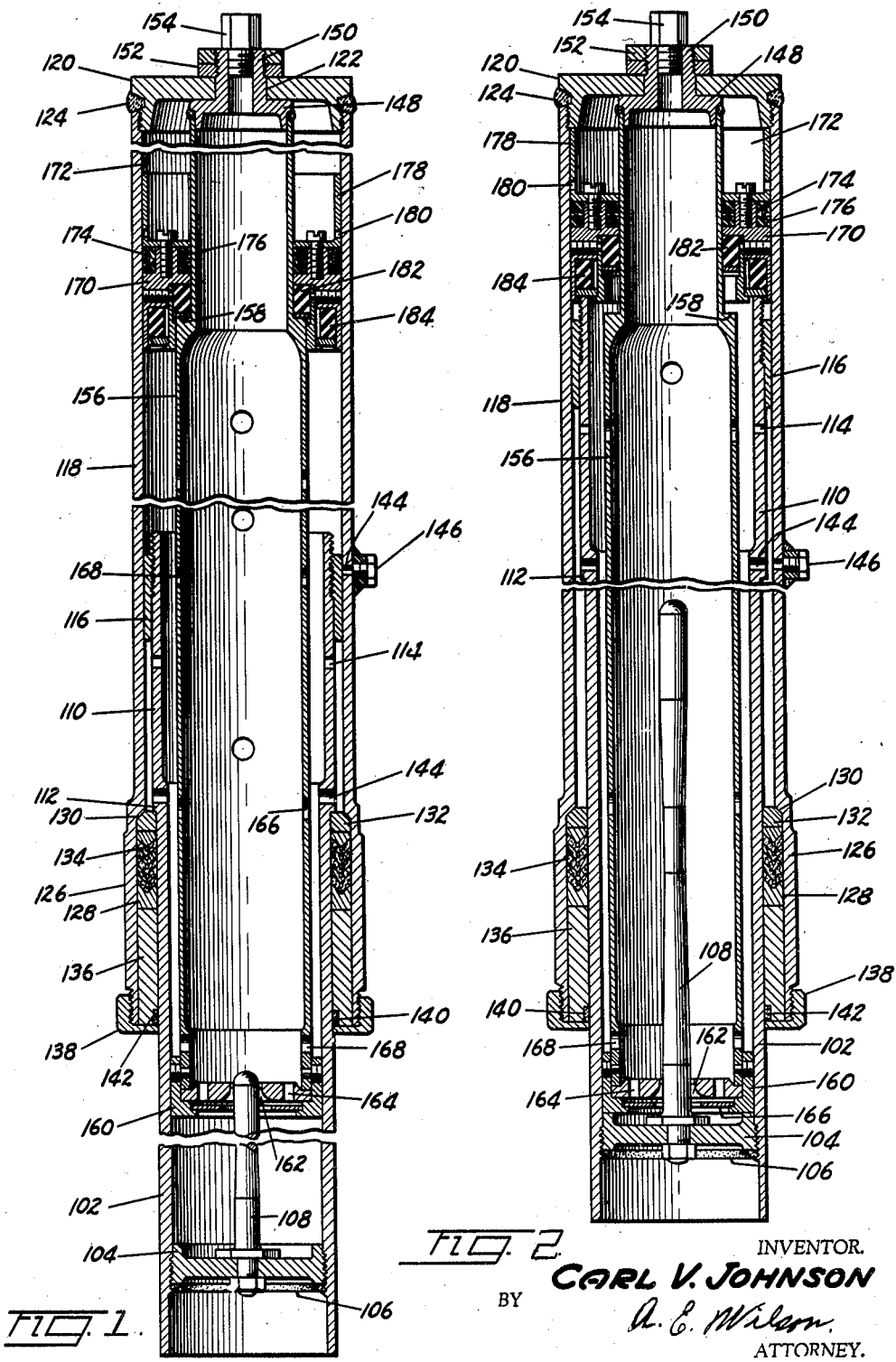

2,197,474

UNITED STATES PATENT OFFICE 2,197,474

SHOCK STRUT

Carl V. Johnson, South Bend, Ind., assignor to Bendix Aviation Corporation, South Bend, Ind., a corporation of Delaware Application May 19, 1937, Serial No. 143,456

1 Claim. (Cl. 267—64)

This invention relates to shock absorbers, and more particularly to shock absorbing struts for airplanes.

It has been found highly desirable in shock absorbing struts for airplanes to provide suitable means for absorbing the initial shock of landing without rebound, and means effective after the initial shock of landing to resiliently support the load.

Heretofore this has been accomplished by a liquid damping means for absorbing the initial shock of landing and by a spring either enclosed within or sleeved on the strut for receiving and resiliently supporting the load after the initial shock of landing has been absorbed. There are also a few commercial shock absorbing struts for airplanes wherein compressed air is used as a resilient medium for supporting the load after the initial shock of landing. However, in shock absorbing struts of this character the air is compressed throughout the entire stroke of the strut and is not effective only after the initial shock of landing. Accordingly, struts of this type are not to be confounded with the instant invention wherein the resilient medium for supporting the load is not effective until after the landing shock has been largely absorbed.

An object of the invention is to provide a shock absorbing strut operative to absorb the shock of landing without undesirable rebound and to resiliently support the load after the shock of landing has been absorbed.

Another object of the invention is to provide a shock absorbing strut having one medium effective for absorbing the initial shock of landing and a separate and distinct medium effective for supporting the load only after the initial shock of landing.

A further object of the invention is to provide a shock absorber for an airplane including fluid metering means for absorbing the initial shock of landing and air or gas under pressure for resiliently supporting the load after absorption of the landing shock has been effected.

Other objects of the invention will appear from the following description taken in connection with the drawing forming a part of this specification, and in which:

Figure 1 is a vertical sectional view of a shock absorbing strut illustrating the strut in extended position; and Figure 2 is a vertical sectional view of the same strut illustrated in Figure 1 in the compressed position.

The invention is shown in the drawing in an embodiment which includes a cylindrical casing 102 having threaded in its lower end a diaphragm or support 104 secured against displacement as by a welding bead 106. The head also serves to seal the lower end of the casing against leakage, and suitably mounted on the support 104 is a metering pin 108 of the conventional type.

The casing 102 has a portion 110 of increased diameter providing an annular shoulder 112 adapted to function as a stop to limit the extension of the strut. This enlarged portion 110 of the casing is apertured as indicated at 114, and threaded thereon is a collar 116, the purpose of which will hereinafter appear.

A casing 118, closed at its upper end as by a cap 120 having a concentric opening 122, and opened at its lower end, telescopes the casing 102 and is adapted to slide smoothly on the collar 116. The cap 120 is threaded in the upper end of the casing and is secured against displacement by a welding bead 124 which also serves to effectively seal the upper end of the casing against leakage. The lower end of the casing 118 has an enlarged portion 126 providing a packing chamber 128 and an internal shoulder 130, preferably inclined.

A ring 132 fitted in the packing chamber 128 abuts the inclined shoulder 130. This ring is adapted to slide smoothly on the casing 102 and to cooperate with the shoulder 112 on the casing 110 in limiting the extension of the strut. The packing chamber 128 also has therein suitable packing rings 134 and a collar 136 held against displacement by a retaining ring 138 threaded on the free end of the packing chamber. The collar 136 is adapted to slide smoothly on the casing 102 and is provided with a gland 140 filled with a suitable packing material 142 for removing dirt from casing 102 of the strut. This casing 118 also has a filling opening 144 for the introduction of liquid, and the opening is normally closed as by a plug 146.

A short cylindrical fitting 148 on the back of the cap 120 includes a concentric sleeve 150 extending through the opening 122 in the cap. Locknuts 152 threaded on the sleeve clamp the fitting to the cap, and a plug 154 normally closing the sleeve includes a check valve, not shown.

A double diametrical casing 156 provides, at the junction between that portion of the casing having the smaller diameter and that portion of the casing having a relatively larger diameter, an annular shoulder 158, the purpose of which will hereinafter appear. The upper end of the casing, or that end having the smaller diameter, is fixedly secured to the fitting 148. The casing 156 depends from the fitting 148 into the casing 102 and has on its lower end, or that end having the larger diameter, a piston 160 reciprocable in the casing 102. The piston 160 is provided with a concentric orifice 162 for cooperation with the metering pin 108, and a plurality of spaced apertures 164 controlled as by a flap valve 166 operative to close the apertures during the compression stroke of the piston, and arranged in the wall of the casing 156 above the piston are a plurality of apertures 168 for relieving pressure on the fluid back of the piston during the compression stroke.

A floating annular piston 170, reciprocable on that portion of the casing 156 having the smaller diameter between the casing 156 and the casing 118, divides the casing 118 so as to provide a compressed air chamber 172 in the upper end of the strut and this chamber is provided with a suitable filling opening normally closed by a plug including a check valve, not shown.

The piston 170 has on its head concentric grooves in which are fitting leak-proof cups 174 and 176 for inhibiting the passage of air from the chamber 172 past the piston. A shell 178 suitably secured to the piston retains the cups against displacement. This shell is adapted to contain a small quantity of lubricant and is provided with a plurality of spaced small apertures 180 through which lubricant may be fed to the piston. The lubricant also provides a liquid seal for the air chamber 172. Suitably attached to the back of the piston is a flexible ring 182, preferably rubber, providing a cushioned seat for the piston when the piston is at rest or in fully extended position on the annular shoulder 158, and also suitably attached to the back of the piston is a similar flexible ring 184 providing a cushioned seat for the piston when engaged by the upper end of the casing 102, as when the strut is in the compressed position.

The mode of operation of this strut is substantially the same as that given for the preferred embodiment of the invention. However, for the purpose of continuity, the operation may be given as follows:

The initial impact of the landing causes the pressure on the fluid in the casing 102 to close the valve 166, and thereafter the fluid is forced through the orifice 162 in the piston 160 past the metering pin 108 into the casing 156, thence through the apertures 168 into the casing 102 back of the piston, and through the apertures 114 in the casing 102 into the casing 118. This results in effectively damping the initial shock of landing and in reducing to a minimum the pressure on the fluid in the strut. Upon absorption of a predetermined portion of the shock of landing, the upper end of the casing 102 engages the back of the piston 170 and thereupon the load is partially transferred to the piston 170. Movement of this piston 170 is resisted by the pressure on the air or gas contained in the chamber 172 to the end that the load is resiliently supported.

When the airplane takes off or ascends, the strut returns to its fully extended position and in assuming his position the air or gas under pressure returns the piston 170 to its seat on the annular shoulder 158 and the weight of the landing gear attached to the lower end of the strut moves the casing 110 downwardly until the stop 112 thereon engages the ring 132.

While the invention has been described in connection with one specific embodiment, the principles involved are susceptible of numerous other applications that will readily occur to persons skilled in the art. The invention is, therefore, to be limited only as indicated by the scope of the appended claim.

Having thus described the various features of the invention, what I claim as new and desire to secure by Letters Patent is—

A shock strut comprising connected inner and outer casings arranged to telescope with a lower casing of intermediate diameter, and a floating annular piston within the outer casing and sleeved on the inner casing and backed by a fluid pressure heavy enough to carry a taxying load and which is engaged by the end of the lower casing after the shock of landing has been absorbed, said strut having means for forcing liquid upwardly from the lower casing through a restricted orifice to absorb the shock of landing, and said inner and lower casings having openings through which the liquid thereafter can pass into the outer casing.

CARL V. JOHNSON.